UNITED STATES PATENT OFFICE.

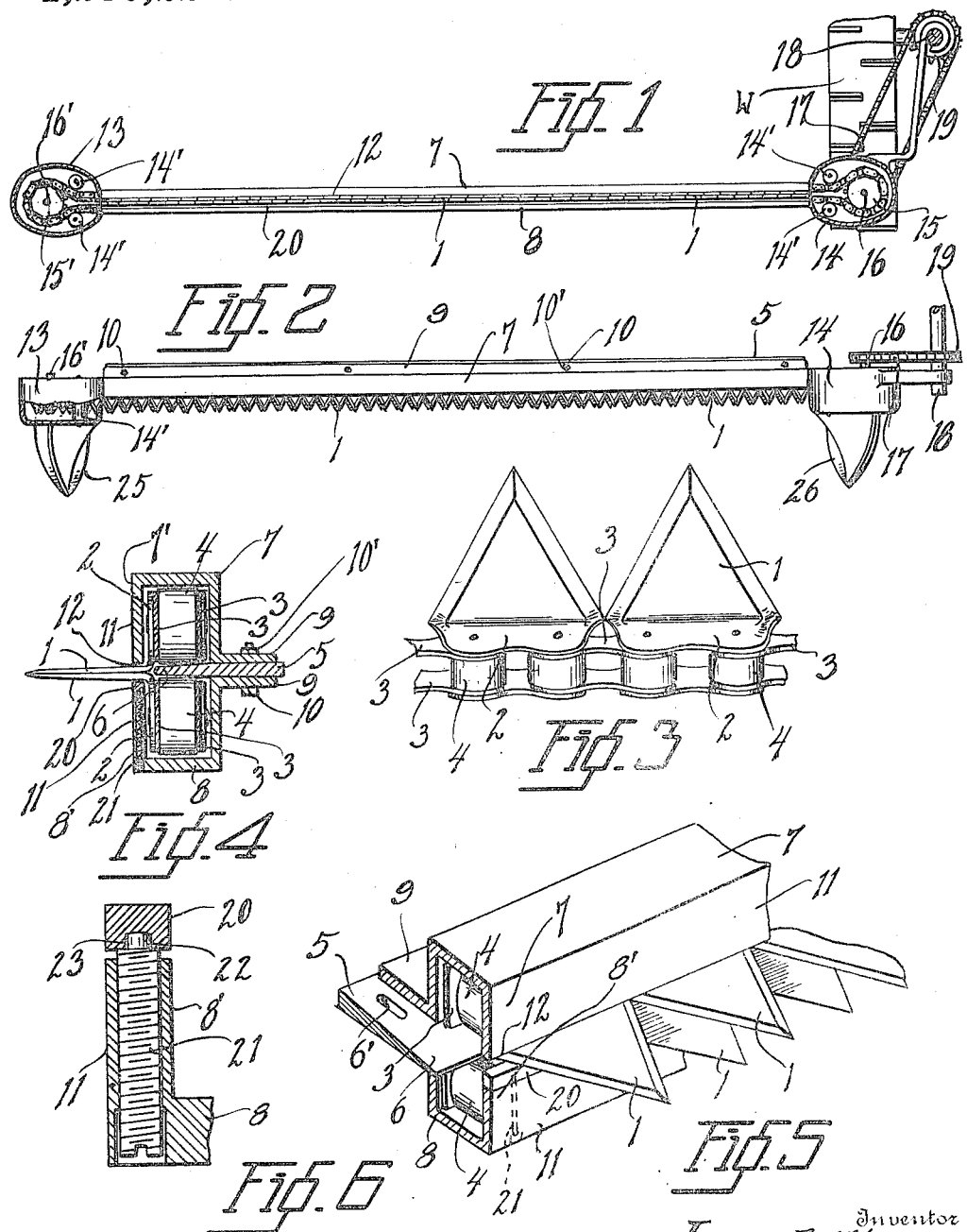

JAMES W. HIGGINS, OF REPUBLIC, WASHINGTON.

CUTTING APPARATUS.

1,280,223.  Specification of Letters Patent.  Patented Oct. 1, 1918.

Application filed December 17, 1917. Serial No. 207,524.

*To all whom it may concern:*

Be it known that I, JAMES W. HIGGINS, a citizen of the United States, residing at Republic, in the county of Ferry and State of Washington, have invented certain new and useful Improvements in Cutting Apparatus, of which the following is a specification.

The present invention relates to an improved cutting apparatus of the endless type, designed especially for use with harvesters or mowers, for cutting grain stalks, hay, or other vegetation.

The invention is designed particularly for the purpose of improving cutting apparatus of this nature wherein a chain, or other endless device, carries the sickle teeth or blades in two flights, passing in opposite directions, and it contemplates the utilization of adjusting devices for taking up wear of the wear plate upon which the rollers of the endless chain travel. The invention also contemplates a novel form of wear or bearing plate for the endless chain by means of which the sickle blades or teeth are held in operative engagement, and this feature of the invention is augmented by the presence of an adjusting bar that may be elevated to adjust the blades vertically. These, and other improved features of novel construction and combinations of parts, form the essence of the invention, as set forth in the accompanying drawings wherein I have depicted a complete physical embodiment of the invention constructed and arranged according to the best mode so far devised for the practical application of the principles of the invention.

Figure 1 is a view in front elevation of so much of the device as necessary to illustrate its relation to the mower or harvester, part being broken away for convenience of illustration.

Fig. 2 is a top plan view of the cutting apparatus.

Fig. 3 is an enlarged, detail, perspective view showing a portion of the endless chain and a pair of cutters or sickle teeth.

Fig. 4 is an enlarged sectional view through the cutter bar, showing the teeth and the supporting rollers forming part of the cutter carrying chain.

Fig. 5 is a perspective view showing the cutter bar, housing, and teeth, in detail.

Fig. 6 is a sectional detail showing the adjusting device for the cutter teeth.

In the preferred embodiment of the invention as illustrated in the drawings, the cutters or sickle blades 1 are of the usual type with beveled cutting edges, and each blade is formed with an integral flange 2 by which the teeth or blades are attached to the cutter-carrying links 3 of the endless chain. The chain is equipped with rollers 4 and these rollers, which are greater in diameter than the width of the flanges 2 of the sickle blades, travel over the cutter bar 5, the front portion of the cutter bar 6 forming a trackway for the upper and lower leads of the endless chain.

It will be noted that the upper and lower surfaces of the track portion of the cutter bar are inclined, the forward part of the bar being somewhat beveled, in order that the rollers of the chain may run or travel over the beveled tracks so that the cutting edges of the blades 1, as they pass in opposite directions, will move by each other in contact, producing contact of their cutting edges such as is found in a pair of shears.

The adjustment or relation between the edges of the blades, due to wear between the rollers and their beveled tracks, may be taken up by moving the cutter bar forward, and this is permitted by the presence of the slots 6' in the bar through which the bolts 10 are passed.

The chain is inclosed within a housing comprising the upper section 7 and lower section 8, each section having a horizontally disposed flange 9 at the rear, and the bolts 10 are utilized to clamp the housing sections to the cutter bar. At the front, the plates 11, 11, of the sections are spaced apart to form a longitudinally extending slot 12 for the accommodation of the sickle blades which project therethrough and travel backward and forward from end to end of the cutter bar and around in the enlarged casings 13 and 14 at the ends of the housing, the chain being guided by the pulleys 14' in the casings. At one end the chain passes over the driven sprocket 15 on shaft 16, and at the other end of the housing an idle pulley 15' on shaft 16' guides the chain, so that as the shaft 16 is driven from the drive chain 17, drive shaft 18 and driving sprocket 19, the endless chain is operated, with its upper and lower leads traveling in opposite directions, and the sickle blades of the mowing machine are operated through these connections from the traction wheel indicated at W.

The rollers, as before stated are of greater diameter than the width or depth of the flanges of the sickle blades, thus insuring that the weight of the endless chain and blades is borne by the rollers on their tracks, thus preventing undue friction of the moving parts on the stationary parts. As the tracks or rollers wear away from friction, the cutter bar may be projected forward by withdrawing the bolts 10, and pushing the bar the desired distance, and then clamping the bolts in place by tightening up the nuts 10'.

The blades on the lower lead of the chain are directly supported on a wear plate or elevating bar 20, which is located just above the top edge of the flange 8' and just below the edge of the flange 7' of the housing sections, in position to support the lower series of sickle blades or cutter teeth. This bar is supported by a plurality of adjusting screws 21 which are threaded upwardly from the bottom, through the lower flange 8' and the lugs 22 on the ends of the screws enter complementary sockets 23 in the bar so that the bar is rigidly supported above the flange, and by turning the screws the bar may readily be elevated, or lowered, as desired. In this manner the lower teeth may be adjusted with relation to the upper teeth to keep the two sets of teeth in close frictional contact in addition to the action of the movement of the rollers over the beveled faces of the cutter bar, and the elevating bar or wear plate insures a uniformly level lower set of teeth for the upper teeth to pass over.

The two guard fingers 25 and 26 perform their usual functions, and the action of the teeth or cutters is practically the same as in the typical sickle type of mowers, i. e., the stalk, grain, or vegetation is cut by the action of the two converging beveled cutting edges, one on an upper tooth and one on a lower tooth, as the two leads of the chain with their two sets of teeth pass by each other in opposite directions. The slight tilting of the rollers due to the beveled tracks on the cutter bar, causes the cutting edges of the two co-acting teeth to make a clean cut of the stalk or grain, and eliminates the possibility of small pieces of the cut stalk passing between the two blades, which action would tend to open or split the upper and lower blades or teeth and prevent satisfactory operation of the sickle.

What I claim is:—

1. The combination in a cutting apparatus for harvesters and the like, with a cutter bar having beveled tracks, of an endless chain and cutting blades thereon, and rollers forming part of the chain to pass over said tracks.

2. The combination in a cutting apparatus for harvesters and the like, with a cutter bar, an endless chain supported thereon and guided over the bar, a housing for the chain and bar, and an adjustable portion forming part of the housing adapted to support the lower series of blades.

3. The combination in a cutting apparatus with an endless chain and cutter blades thereon, of an adjustable supporting member for the lower series of said blades.

4. The combination with an endless belt or chain having cutting blades thereon, and rollers forming part of the chain, of a supporting housing, and an adjustable cutter bar provided with beveled surfaces for said rollers.

5. The combination in a cutting apparatus for harvesters of a housing having a front slot and a cutting bar supported therein and provided with beveled tracks, of an endless chain having rollers on the tracks and blades attached to the chain forming upper and lower cutting devices traveling in opposite directions, a wear bar for the lower blades, and adjusting screws in the housing for supporting said wear bar.

In testimony whereof I affix my signature.

JAMES W. HIGGINS.